INVENTOR.
ERICH S. GUTTMANN
BY William T. O'Neil
AGENT

Feb. 13, 1968  E. S. GUTTMANN  3,368,448
INTEGRATED NAVIGATIONAL SITUATION DISPLAY WITH
HIGH EFFICIENCY LIGHT BEAM COMBINER
Filed Oct. 4, 1965  2 Sheets-Sheet 2

INVENTOR.
ERICH S. GUTTMANN
BY William T. O'Neil
AGENT

United States Patent Office

3,368,448
Patented Feb. 13, 1968

3,368,448
INTEGRATED NAVIGATIONAL SITUATION DISPLAY WITH HIGH EFFICIENCY LIGHT BEAM COMBINER
Erich S. Guttmann, Pasadena, Calif., assignor to International Telephone and Telegraph Corporation, New York, N.Y., a corporation of Maryland
Filed Oct. 4, 1965, Ser. No. 492,672
15 Claims. (Cl. 88—24)

ABSTRACT OF THE DISCLOSURE

A light beam combiner making use of two projection lenses and a miniature reflector or micro-prism is described. One lens projects a pattern from a first source, a cathode ray tube as shown, directly onto a viewing screen.

A second lens of a retro-focal type has a small diameter exit pupil at a predetermined distance on its output side, through which all of its output light passes before diverging into an output cone of light. This second lens projects a second pattern from a second source, an illuminated photographic film as shown.

The relation of these components in such that the axes of the lenses are at an angle and the small exit pupil of the second lens falls within the exit cone of light of the first lens. The miniature reflector or micro-prism is located at the said exit pupil and is oriented to redirect light from the second lens in substantially the same direction as the output cone of light from the first lens. The miniature reflector or micro-prism is at least as large in reflective surface as the effective area of the said exit pupil, but small as compared to the cross-sectional area of the output cone of light of the first lens at the location of the miniature reflector or micro-prism. Accordingly, the combination of beams from both lenses is effected with minimum loss of light transmission efficiency.

Specification

This invention relates to projector type displays in which there are two or more sources of optical image data to be combined in a single presentation.

More specifically, this invention relates to a high efficiency light beam combining system for use with a projector type navigational situation display or other type of optical projector system.

In the prior art various ways have been devised of combining light beams in order to effect a single superimposed and registered presentation. Perhaps the most obvious of these involves the use of separate projector systems which illuminate a screen simultaneusly and independently. In that particular method there is duplication of all lenses and other elements resulting in substantial cost and physical size of the resultant instrumentation. Also, since two projection lenses cannot occupy the same space it is necessary that each lens be located at least at a slight angle with respect to the screen normal. Thus each illuminates the screen obliquely, and the result is a type of distortion called keystoning and a compromise in focusing when screen and lenses are not far apart but must all be in the same relatively small instrument enclosure.

Partially silvered or dichroic mirrors have been extensively used in light beam combining applications. These have the advantage that the beams may be essentially coaxial. However, systems using dichroics inevitably suffer white light discoloration because of spectral dissection.

Systems using half mirrors inevitably suffer light losses of 50% of the total luminous energy.

It is the principal object of the present invention to provide a unique combination whereby a compact situation display combines and presents registered light images from separate sources of said images on a screen. It may also be said that an important object of the present invention is the development of a unique beam combining structure having negligible inherent loss of light intensity and color fidelity and therefore a very high efficiency.

For purposes of illustration and description of the present invention drawings are provided as follows.

U.S. Patent No. 3,209,645 issued Oct. 5, 1965 entitled, "Navigational Situation Display With Cylindrically Shaped Film," illustrates and describes in considerable detail a device to which the present invention is particularly adaptable.

Figure 1:
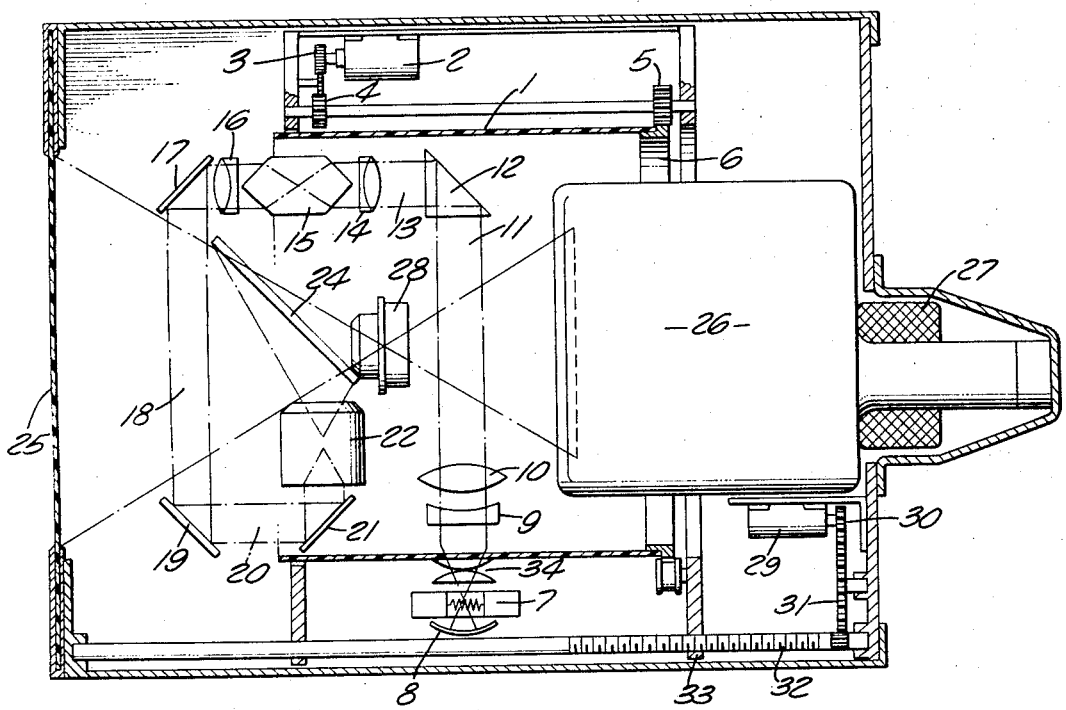
FIGURE 1 depicts a first embodiment of a situation display wherein beam combination is effected in a very compact device.

Referring now to FIGURE 1, an assemblage of components as used in the aforementioned U.S. Patent No. 3,209,645 is shown. A cylindrical film drum, shown in section at 1, is capable of being rotated by a drive motor 2 through gears 3, 4, and 5. A collar ring 6 and a similar collar ring at the opposite end of the film cylinder serves to support the film in the cylindrical shape and to receive the rotary motion from the gear 5. In this way the presentation of optical data such as map information is varied by rotation of the drum corresponding to either longitude or latitude change. The other coordinate which would be latitude if the drum rotation corresponds to longitude, is controlled by slewing the entire film drum and rotary drive assembly axially. For this purpose an additional drive motor 29 operating through gears 30 and 31 drives a lead screw 32 which in turn engages the movable structure at 33. A stationary projector lamp 7 operating in cooperation with the reflector 8 and a condenser lens system 34 operates to pass light through a predetermined portion of the drum shaped film 1, thence through lens system 9 and 10 to form a light beam 11 which is diverted substantially at right angles by a prism 12 to form a diverted light beam 13 which is still further processed by lenses 14 and 16 operating in cooperation with a dove prism 15. Mirror 17 then establishes a new light beam direction 18 and mirror 19 further diverts the beam as shown at 20. Mirror 21 serves to direct light through the projector lens 22 which transmits a divergent cone of light to the partially silvered mirror 24. The angle of the partially silvered or dichroic mirror 24 is such that the output cone of light of the projection lens 22 is rediverted toward the screen 25. The dove prism 15 serves to rotate the light column, around its axis so that the presentation observed at the rear illuminated screen 25 can be rotated. It can, for insance, be heading oriented for the benefit of a pilot so that the display is in register with his natural view through the windshield. As indicated in the aforementioned U.S. Patent No. 3,209,645 the primary utility of the overall device described is as a navigational situation display for aircraft use particularly. Accordingly, the longitude and latitude drive motors 2 and 29 would be controlled by externally supplied navigational data, and also the dove prism 15 would be controlled by a similar servomechanism responsive to heading signals. Thus the map data presentation on the screen 25 can be made to always appear forward oriented for the pilot of an aircraft. In the present invention there is added to the structure of U.S. Patent No. 3,209,645 the additional capability of also presenting data, such as from a cathode-ray tube 26, through an additional projection lens 28 which directs light through the partially silvered mirror 24, in the non-reflective direction of said half mirror and hence onto the rear illuminated screen 25. In this way additional data as from ground or airborne radars, electronically generated position symbols or televised information of any appropriate type can be merged with the optical map data provided by the film drum 1 through the folded interior optical system described above. The cathode-ray tube 26 is shown with deflection coils 27, however, an electrostatically deflected cathode-ray tube could be expected to perform the function of this cathode-ray tube 26 equally well. The details of excitation and synchronization of the cathode-ray tube 26 are not a part of this invention and it is assumed that any such arrangement for driving the cathode-ray tube 26 to present optical data on its screen including scale factor correspondence and concentricity with the map drum information would be known in the art.

Such devices are intended for use in aircraft cockpits where extraneous light, including daylight and even direct sunlight establish an extremley bright ambient light environment. In order to have a presentation of suitable brightness, it is imperative that the internal light transmission efficiencies be maximized. The expedient of unlimited increase of projection lamp wattage is not proportionally helpful, since color temperature of the emitted light stands as a limitation on light intensity irrespective of lamp size. The use of a dichroic mirror at 24 in FIGURE 1 has the advantage that the light efficiency is improved over the ordinary partially silvered mirror. The dichroic mirror is generically a partially coated device which has selective characteristics in respect to spectral colors. Such a coated mirror is sometimes referred to as in interference filter and may be thought of as an optical narrow band filter. For use at 24, such a mirror would be designed as a "spike" filter with maximum transmission within a narrow band centered approximately at the wavelength of the band of light emitted by the cathode-ray tube 26. The fact that light at other frequencies would be reflected and not passed through the mirror is no disadvantage since the light emitted by the cathode-ray tube is substantially monochromatic. Light striking the mirror from lens 22 is "broad-band" light and would be reflected toward the screen 25, except for those components within the "spike" pass band. The result would be presentation of a discolored light pattern from the film drum data which is, however, not seriously attenuated in overall intensity. A yellow-green phosphor light for instance, results in a markedly magenta colored map.

Figure 2:
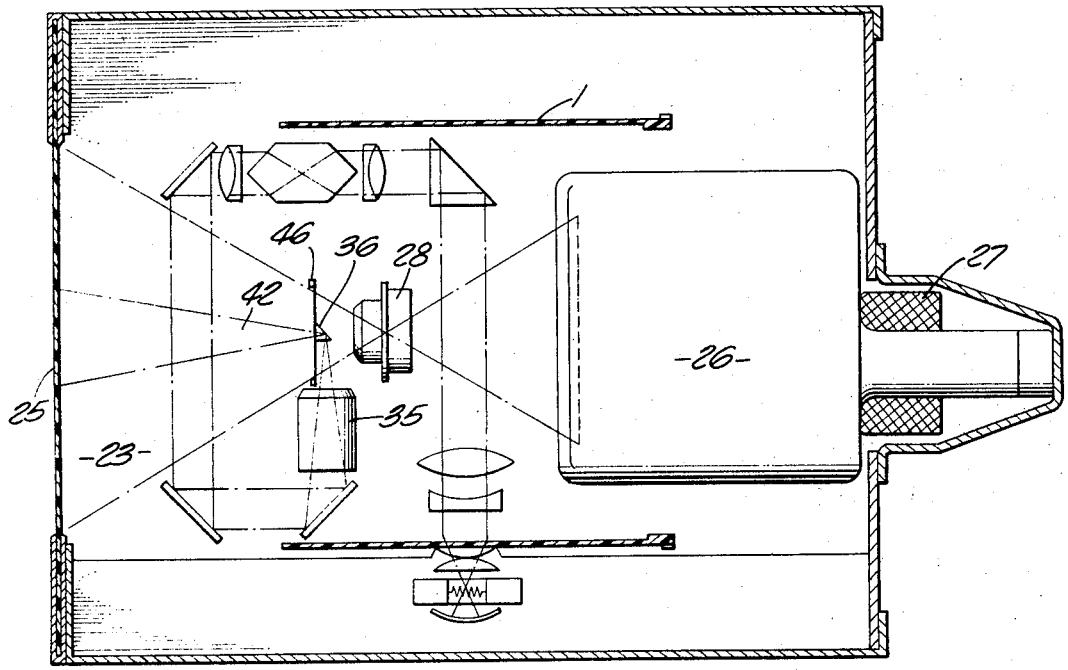
FIGURE 2 illustrates a second embodiment wherein unique beam combining means are provided for obtaining high light efficiency.

A preferred embodiment of the present invention is illustrated in FIGURE 2. All optical components concerning the projection of map data from the cylindrical drum 1 remain the same as in connection with FIGURE 1, however the light combining structure in the FIGURE 2 embodiment affords beam combination with even higher light transmission efficiency than the FIGURE 1 arrangement with a dichroic mirror and is free from the image color distortion which the said dichroic mirror introduces. In FIGURE 1 the light combining mirror 24, if not of the dichroic type, is necessarily of such a design that it will reflect an appreciable portion of the light from the lens 22 toward the screen 25 but may not be so heavily silvered as to reject too great a portion of the light which it is required to pass from the lens 28. Since maximum reflection of light on the one hand and minimum loss in passing light through the mirror 24 are mutually inconsistent, a compromise is necessary in the FIGURE 1 embodiment. The light from the cathode-ray tube 26 might be of an inherently lower intensity than that which is originated from the projection lamp 7 and passed through the film at the lens 34, unless very high intensity cathode-ray tubes are used.

Referring again to FIGURE 2, it will be noted that no partially silvered mirror is used in the light combining structure. Instead, a miniature totally reflecting prism 36 which is of a very small size compared to the lens 28, is located within the exit cone of light 23 from the lens 28. Because of its comparatively small size the prism 36 interrupts a very small portion of the cone of light 23 from the lens 28. In a practical instrument, in accordance with FIGURE 2, it has been found that the prism 36 interrupts an area of light within the cone 23 of only 0.003 square inch, whereas the effective cross-sectional diameter of the light cone 23 at the position of the prism 36 is 1.8 square inches. It will be readily seen therefore, that the prism 36 thereby interrupts only approximately 0.18% of the light from the lens 28 being projected toward the screen 25. In order to make use of a very small prism 36 the lens 35 is necessarily of a substantially different nature than lens 22 in FIGURE 1. The lens 35 in fact is of a type having a small exit pupil at a predetermined distance from its exit window. One particular lens configuration which satisfies the requirements for lens 35 is an eyepiece-type projection lens. Examples of such lenses are described in a U.S. Government Manual entitled "Design of Fire Control Optics," vol. 2, ORDM. 2–1 Ordnance Corps March 1953, as Erfle and Bertele eyepieces.

Figure 3:
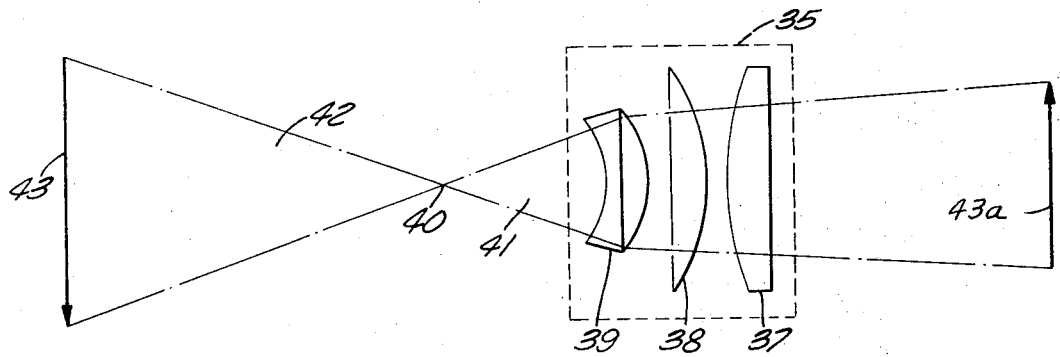
FIGURE 3 illustrates diagrammatically a type of projection lens utilized in the embodiment of FIGURE 2.
Figure 4:
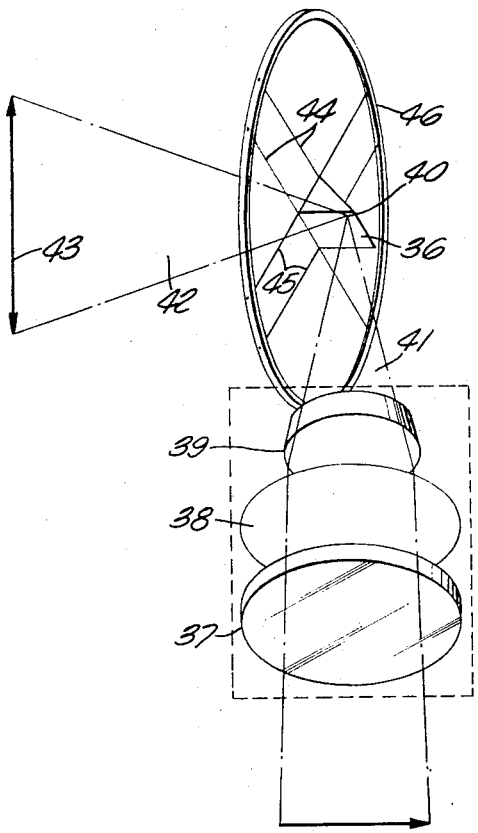
FIGURE 4 illustrates the application of the lens of FIGURE 3 with the additional structure utilized in the embodiment of FIGURE 2.

Referring now to FIGURE 3 a lens suitable to perform the function required of lens system 35 is illustrated diagrammatically. Three elements 37, 38, and 39 act in cooperation to project an object 43a into a magnified image 43 after passing all of the light emitted through said lens system through a converging light cone 41, through an exit pupil 40, and thence into a diverging light cone 42. In accordance with the known characteristics of lenses such as, for instance, the Bertele eyepiece referred to above, careful design and manufacture will produce an exit pupil of very small cross-sectional area. In FIGURE 4 the prism 36 and its supporting structure as applied in FIGURE 2 are illustrated in more detail. It will be seen that light from the source 35, which would be light images from the film cylinder 1 in FIGURE 2, is passed through an exit pupil 40 which falls substantially at the totally reflective hypotenuse surface of the prism 36 and therefore the diverging light cone 42 is directed at right angles as compared to the axis of the converging light cone 41. The output image 43 of course falls on the rear illuminated screen 25. The spider assembly comprising the ring 46, and tension wires 44 and 45 should be thought of as being one of a number of acceptable structures fulfilling the requirements for the support of the prism 36. The prism 36 would be fastened to the wires 44 and 45, and the entire spider would preferably be of such a diameter that the ring 46 would fall outside the cone of light 23 as illustrated in FIGURE 2. Wire support members 44 and 45 are so small and far from either focal plane as to constitute negligible interruption of the cone of light 23 and as not to image on the screen.

As illustrated in FIGURE 2 a cone of light 42 is projected to the screen 25 thereby to effect merging of light images passing through the lens systems 28 and 35. The comparative size of the light cones 23 and 42 is illustrative only and there is no reason why the light cone 42 may not produce an image of equal size to 23, thereby providing the information available from the cathode-ray tube 26 over the full area of the screen 25 as is the case with data projected from the film drum 1.

Figure 5:
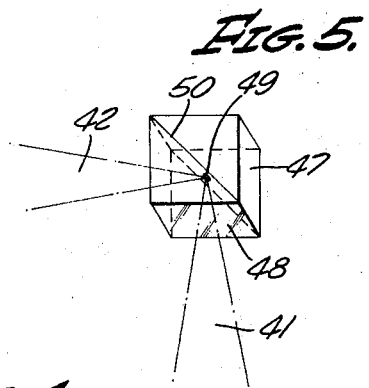
FIGURE 5 illustrates an alternative structure for providing the light reflection function in the FIGURE 2 embodiment.

Referring now to FIGURE 5, another alternative form of light reflector for the beam combiner of FIGURE 2 having certain advantages is shown. Two prisms 47 and 48 are cemented together along the line 50, A highly reflective silvered spot 49 is deposited on one of the prisms before they are joined, and is thereby established in a sealed environment and accordingly protected from deterioration. It is desirable that the reflective efficiency of the spot 49 be as great as possible and the sealed environment insures its continued efficiency. The size of the spot 49, which is shown elliptically shaped, need not be greater than corresponds to the exit pupil itself if the structure is arranged so that the spot 49 is at the optimum location with respect to lens 35 (i.e., if the exit pupil falls accurately at 49). The elliptical shape is the projection of the circular cross-section of the exit pupil onto the prism joint which is an angle as indicated at 50.

No materials other than those well known in the optical art are required. Considerable choice as a matter of design option within the normal skill of the art is possible in the selection of suitable materials.

Modifications and variations on the illustrations that fall within the spirit and scope of the present invention will occur to those skilled in the art. For example, the prism 36 or the variation of FIGURE 5 need not be located precisely on the center line of the lens 28. Moreover, the technique of FIGURE 2 is adaptable to the inclusion of more than one prism, such as 36, at various positions within the cone 23, each receiving light from a corresponding lens, such as 35, thereby to merge a number of light image beams into the presentation at the screen 25. Although it has been contemplated that the exit pupil associated with the lens 35 should fall substantially at the reflective hypotenuse of prism 36, or the spot 49 as the case may be, it is entirely possible that the exit pupil could fall somewhat before or after the light intersection with the said hypotenuse of the prism. In order to obtain the most effective results with the present invention however, it is desirable that the exit pupil fall as nearly as practically possible on the reflection surface of the prism, since to do otherwise would have the effect of increasing the required size of the prism or the spot 49 and reducing the advantage provided by keeping the reflection device small as compared to the effective cross-sectional area of the exit cone of light from the lens 28 at the exit pupil location. In the illustrations of FIGURE 2 and FIGURE 4 the illustrated size of the prism 36 has, in fact, been exaggerated for clarity of illustration.

Concerning the support of the prism 36, it is actually possible as an alternative, to cement this directly to the surface of lens 28 as a support means in lieu of a structure such as ring 46 and wires 44 and 45. The alternative beam combiner reflector of FIGURE 5 is even more easily cemented to lens 28, since it has flat surfaces more convenient mechanically.

Since the very small reflective spot 49 is the only element which interrupts light from lens 28, the prisms 47 and 48 are not necessarily small as is the case with the prisms 36. Prisms 47 and 48 can be larger than the cross-section of cone of light 23 at the exit pupil location if this is more convenient mechanically. In that event, all of the light from lens 28, except that negligible amount interrupted by spot 49, would pass through prisms 47 and 48 with only insignificant attenuation.

The above comprise only a few of the possibilities which, it is submitted, fall within the scope of the broad inventive concepts of the present invention. The drawings are to be considered illustrative only and not for the purpose of defining the scope of the invention. Accordingly, what is claimed is:

1. An optical system for combining images derived from separate sources comprising: a first luminous source; a light receiving device; a first lens system arranged to receive light from said first luminous source and project said light toward said light receiving device; a second luminous source; a second lens system arranged to receive light from said second luminous source, said second lens system being of a type which has an exit pupil at a predetermined external distance from said second lens system, and said second lens system being located with its axis at an angle in relation to the axis of said first lens system and spaced such that said exit pupil falls within the exit cone of light of said first lens system; and light directing means located substantially at said exit pupil to direct said light from said second lens system toward said light receiving device, said light directing means being of large surface compared to the effective diameter of said exit pupil but of small surface compared to the cross-sectional area of the said exit cone of light of said first lens system at the location of said exit pupil.

2. The invention set forth in claim 1 further defined in that said first and second lens systems are spaced and oriented such that the axes of said first and second lens systems intersect and said exit pupil falls substantially at the said intersection.

3. The invention set forth in claim 1 further defined in that said first and second lens systems are oriented such that the axes of said first and second lens systems intersect, said second lens system is spaced with respect to the axis of said first lens system such that said exit pupil falls substantially at said intersection, further that said light directing means comprises a reflector small in size compared to the cone diameter of said first lens system but large compared to the effective diameter of said exit pupil, and said reflector is of a design so as to redirect light from said second lens system toward said light receiving device.

4. The invention set forth in claim 1 further defined in that said first and second lens systems are oriented with their axes substantially at right angles in a plane with respect to each other so that said axes intersect and said lens systems are spaced so that said exit pupil falls at said intersection.

5. An optical projection system for combining images derived from separate sources comprising the combination of: a first luminous source; a first projection lens system arranged to project light from said first luminous source in a predetermined direction; a second luminous source; a second lens system having an exit pupil at a predetermined distance therefrom, said exit pupil constituting an aperture of small diameter compared to the diameter of said first lens system, through which substantially all light output from said second lens passes before diverging into an output field; means locating said second lens system so as to project light from said second luminous source in a second predetermined direction at an angle in respect to said first predetermined direction, said means also to locate said second lens so as to cause said exit pupil to fall within the exit field of said first projection lens system; and means located substantially at said exit pupil for redirecting light projected in said second predetermined direction to said first predetermined direction, said last named means being sufficiently small in size as to interrupt only a minimum amount of light from said first projection lens but being sufficiently large to encompass substantially all of the light passing through said exit pupil from said second lens.

6. The invention set forth in claim 5 further defined in that said means for redirecting light comprises a surface at least partially reflective, and said means is placed at an angle so as to accomplish said redirection of light from said second predetermined direction to substantially said first predetermined direction.

7. The invention set forth in claim 1 further defined in that said light receiving device is a translucent screen arranged to be rear illuminated with respect to the viewing side by said light from said first and second lens systems.

8. In an instrument for geographic situation display which includes a positive photographic film constituting a two coordinate map of an area of interest, film holding and traverse means to hold said photographic film in the shape of a cylindrical surface and to rotate and axially translate said cylindrical surface in accordance with received navigational data, and a translucent screen adapted for rear illumination and located in a plane substantially normal to the axis of said cylindrical surface and adjacent to one open end of said cylindrical surface, the combination comprising: a luminous source of optical data facing said translucent screen through the interior of said cylindrical surface; a first projection lens system located between said luminous source and said translucent screen for projecting said optical data onto said screen; and a second projection lens system for projecting light passed through a portion of said cylindrical surface into the interior thereof, said second projection lens system including a plurality of optical elements within the interior of said cylindrical surface to provide a folded optical system, said folded optical system including a second projection lens of a type having an exit pupil at a predetermined external distance from said second projection lens, whereby substantially all of the light passing through said second projection lens passes through said exit pupil before diverging into an exit cone of light; means locating said second lens with its axis at an angle with respect to the axis of said first projection lens and spaced such that said exit pupil falls within the exit cone of light of said first projection lens; and means located substantially at said exit pupil for redirecting said light from said second projection lens passing through said exit pupil toward said translucent screen.

9. The invention set forth in claim 8 further defined in that said means for redirecting said light from said second projection lens comprises a reflective surface large in size compared to the effective cross-sectional area of said exit pupil but small compared to the cross-sectional area of the exit cone of light of said first projection lens at the location of said reflective surface.

10. An integrated navigational situation display in which a map in the form of a photographic film is positionally controlled in accordance with received navigational analog data and is partially projected onto a display screen and additional data from a cathode-ray tube presentation is integrated into the display presented on said display screen by a second optical system, comprising the combination of: a first projection lens positioned for receiving light from said cathode-ray tube and projecting said light to said display screen; a second projection lens of a type having an exit pupil at a predetermined external distance from said second lens such that substantially all of the light projected from said second lens passes through said exit pupil and thereafter diverges into an exit cone of light; means for locating said second lens with respect to said first lens such that said exit cone of light of said second lens intersects the exit cone of light of said first lens and said exit pupil falls within the exit cone of light of said first lens; and light redirecting means located in the vicinity of said exit pupil for redirecting said exit cone of light from said second lens toward said display screen.

11. The invention set forth in claim 10 further defined in that said light redirecting means is sufficiently large as to intercept and redirect substantially all of the light passing through said exit pupil but is small compared to the effective cross-sectional area of the cone of light from said first lens at the location of said light redirecting means thereby to minimize the interruption of light transmitted from said first lens to said display screen.

12. The invention set forth in claim 10 further defined in that said light redirecting means is located sufficiently close to said exit pupil such that the cross-sectional area of the exit cone of light of said second lens thereby received is small compared to the size of said light redirecting means and the cross-sectional area of the exit cone of light of said first lens remains large at the location of said light redirecting means.

13. The invention set forth in claim 1, further defined in that said second lens system is located outside said exit cone of light of said first lens system, and said light directing means comprises a mirror surface facing said second lens system at an angle, said angle being predetermined so as to redirect light passing from said second lens system through said exit pupil toward said light receiving device.

14. The invention set forth in claim 1 further defined in that said light directing means is a mirror surface, additional means are included for holding said mirror surface at a predetermined angle for redirecting light from said second lens system toward said light receiving device, said additional means comprising at least one light transparent support member, and said mirror surface is located relatively close to said first lens system and relatively far from said light receiving device, thereby to avoid the appearance of an image of said mirror surface at said light receiving device.

15. The invention set forth in claim 1 further defined in that said light directing means is a prism and additional means are included for holding said prism at the location of said exit pupil and at an angle with respect to the axis of said second lens system to redirect light from said second lens system toward said light receiving device.

References Cited
UNITED STATES PATENTS

| | | | |
|---|---|---|---|
| 2,672,072 | 3/1954 | Sachtleben et al. | 88—24 |
| 2,765,704 | 10/1956 | Mottu | 88—24 |
| 3,134,295 | 5/1964 | Brown et al. | 88—24 |
| 3,209,645 | 10/1965 | Guttmann | 88—24 |
| 3,319,549 | 5/1967 | Jackson | 88—24 |

NORTON ANSHER, *Primary Examiner.*

RICHARD M. SHEER, *Assistant Examiner.*